H. HEUSER.
ART OF DEALCOHOLIZING BEVERAGES.
APPLICATION FILED JUNE 4, 1919.

1,426,066.

Patented Aug. 15, 1922.

2 SHEETS—SHEET 1

H. HEUSER.
ART OF DEALCOHOLIZING BEVERAGES.
APPLICATION FILED JUNE 4, 1919.

1,426,066.

Patented Aug. 15, 1922.
2 SHEETS—SHEET 2.

Inventor:
Herman Heuser,
By Dyrenforth, Lee, Chritton & Wiles,
Attys.

UNITED STATES PATENT OFFICE.

HERMAN HEUSER, OF EVANSTON, ILLINOIS.

ART OF DEALCOHOLIZING BEVERAGES.

1,426,066.     Specification of Letters Patent.   Patented Aug. 15, 1922.

Application filed June 4, 1919. Serial No. 301,762.

*To all whom it may concern:*

Be it known that I, HERMAN HEUSER, a citizen of the United States, residing at Evanston, in the county of Cook and State of Illinois, have invented a new and useful Improvement in the Art of Dealcoholizing Beverages, of which the following is a specification.

The present invention relates to processes and apparatus for producing beer or like beverages with a reduced alcohol content, and more particularly to processes and apparatus for this purpose wherein the beer or beverage is subjected to the action of heat while under reduced pressure for the purpose of removing alcohol therefrom.

In accordance with the present invention, beer or the like beverage is heated while under partial vacuum in a closed system, preferably while continuously flowing in the form of a film, and is discharged from the vacuum system directly under atmospheric or higher pressure, whereby it may be immediately subjected to any desired further treatment, such as cooling, artificial carbonation, etc. and without interrupting or disturbing the action of the vacuum system. In order that the invention may be fully and clearly understood, I have shown in the accompanying drawings means whereby the invention may be carried into effect. In these drawings, Fig. 1 illustrates one system of apparatus whereby the invention may be carried out.

Figure 2:
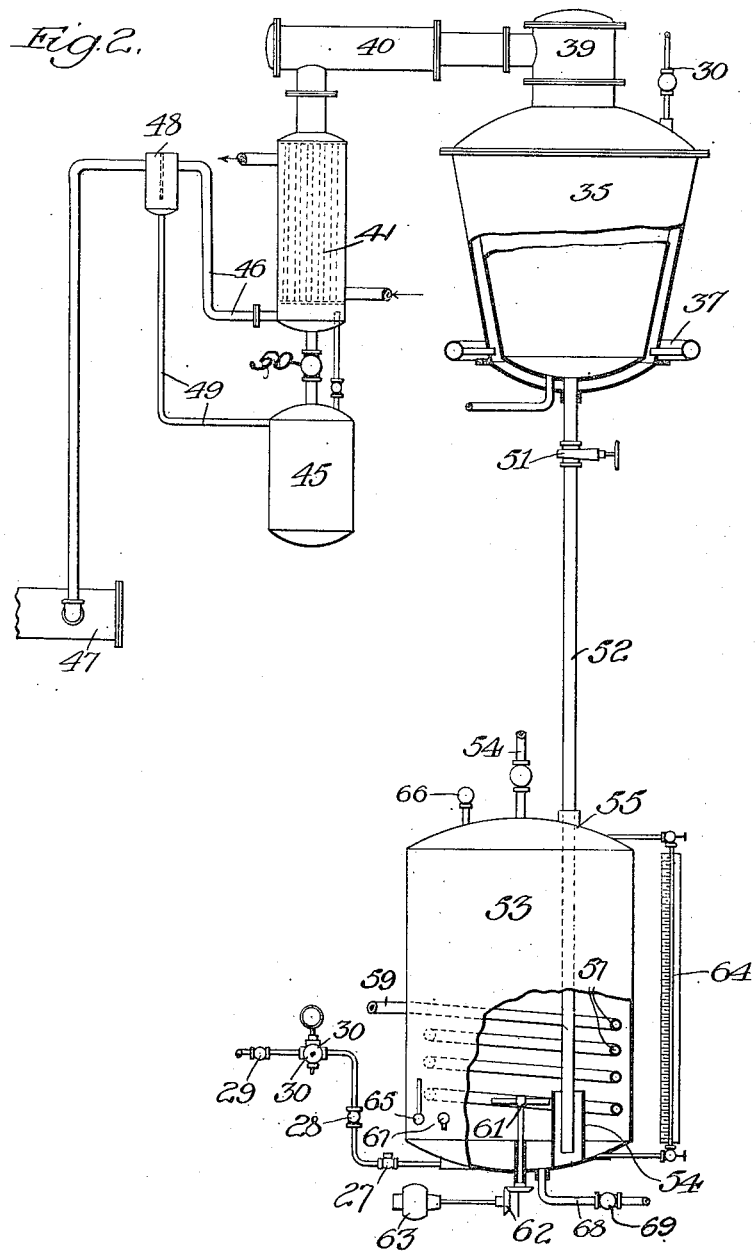

Fig. 2 illustrates a modified arrangement of an apparatus for performing the invention, portions of the apparatus of each figure being shown in section.

Figure 1:
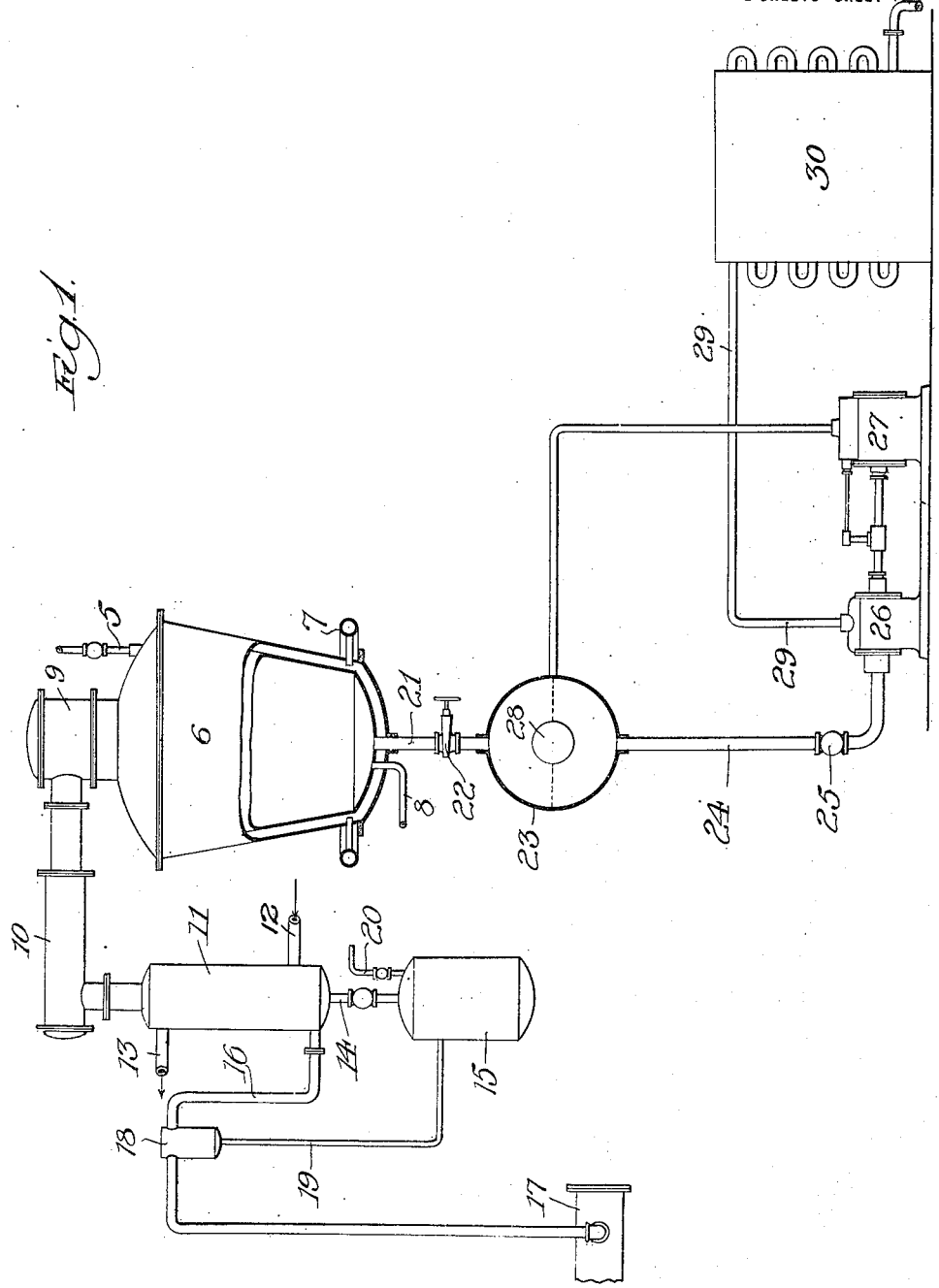

Referring more particularly to the system of apparatus illustrated in Fig. 1 of the drawing, in carrying out the process of the present invention, the beer or beverage to be treated, which may be preheated if desired, is fed through a valve controlled pipe 5 into a jacketed pan 6, in which pan it flows down the walls in the form of a film. The construction of this pan may be substantially similar to that of the pan illustrated in my previous Patent No. 1,227,931 of September 3, 1918. Steam may be introduced into the jacket of the pan 6 by means of a suitable steam pipe 7, and a discharge outlet for condensed water is provided at the bottom of the pan at 8. The alcoholic and other vapors given off from the beer in the pan 6 ascend into the head 9 of the pan and pass therefrom through the conduit or vapor main 10 into the condenser 11. This condenser is provided with suitable inlets 12 and outlets 13 for the cooling medium, which is preferably water, and with suitable discharge means such as the pipe 14 leading into the receiver 15 for liquefied products of condensation and with a discharge pipe 16 for incondensable gases and vapors. A suction pump 17 connected to the gas discharge 16 from the condenser produces the desired degree of vacuum in the entire system. A suitable baffle 18 may be interposed between the discharge outlet 16 and the vacuum pump 17 in order to separate entrained liquids from the gases drawn off, a small pipe 19 conducting these separated liquids to the receiver 15. A small pipe 20 affords communication between the vapor spaces in the receiver 15 and condenser 11, thereby providing for the maintenance of the same degree of vacuum in both elements.

The dealcoholized beverage passing out of the vacuum pan 6 is conducted through a discharge pipe 21, which may be provided with a valve 22, if desired, into a suitable receiver 23, which receiver communicates at its discharge end through a pipe 24, provided with a check valve 25, with the intake of a suction pump 26. This pump is operated by a steam engine 27, or other suitable motor mechanism which is automatically controlled by the level of the liquid in the receiver 23. For example, when a steam engine is used as the motive power for the suction pump 26, the admission of steam thereto may be controlled by a float 28 operating in the receiver 23. From the suction pump 26 the liquid passes through the discharge pipe 29 into a suitable cooling means 30, from which it may pass to any suitable receiver for further treatment.

In carrying out the process, the beverage to be treated is fed intermittently or continuously through the pipe 5 into the vacuum pan 6, in which it is subjected under reduced pressure produced by the action of the vacuum pump 17 to the heat produced by the steam in the jacket of the pan. The vapors pass out through the still head 9 and the vapor main 10 into the condenser 11, from which the condensed alcohol passes into the receiver 15. From the vacuum pan 6 the alcohol-reduced beverage, or beer, passes into the receiver 23, in which it is still under a reduced pressure. When the liquid in this container reaches the desired level, which may be a predetermined level, the discharge pump 26 is caused to operate, removing the liquid from the container 23 and forcing it through the pipe 29 to the cooler 30 and to the apparatus for further treatment. When the level of the liquid in the container 23 drops below a certain point the operation of the pump 26 is stopped, preferably automatically, by the action of the float 28. It is thus apparent that, on the dealcoholized beverage reaching a desired level in the receiver 23, it is intermittently removed therefrom by the application of suction greater than that exerted by the vacuum pump 17, and directly discharged at atmospheric pressure. It may then be subjected to cooling, artificial carbonation, or otherwise treated in the same manner and with the same apparatus as is used in the treatment of similar beverages not subjected to the reduction process under vacuum.

It is readily apparent that the intermediate container 23 may be dispensed with and the action of the pump 26 controlled by means of a float operating directly within the pan 6. In either case, the operation of the system is the same, the dealcoholized beverage being removed directly from a chamber or system under partial vacuum and discharged directly into a space or system wherein atmospheric pressure prevails without the vacuum in the first mentioned system being at any time broken. The operation of the systems does not interfere with each other, nor is the continuity of operation of one system effected by the operation of the other, the vacuum system being always separated from the higher pressure system or the atmosphere by a wall or seal of the treated liquid.

In Fig. 2 of the drawings I have shown a system of apparatus wherein the discharge of the alcohol-reduced beer from the vacuum pan into a system or apparatus under normal atmospheric pressure may be effected automatically and continuously, the increased suction necessary for discharge of the treated liquid being produced by the weight of a column of the liquid itself. In this figure 35 indicates the jacketed vacuum pan in which the treatment of the beer or beverage supplied by pipe 30 takes place, the heating medium being supplied to the jacket of the pan through pipe 37. The vapor condensing system, which operates throughout under vacuum, is illustrated as substantially identical with the corresponding portions of the system illustrated in Fig. 1, the vapors passing through still head 39 and vapor main 40 into condenser 41, from which liquefied condensation products pass into receiver 45 and gaseous or vapori-form products through pipe 46, baffle 48 and suction pump 47. The pipe 49 is provided for the passage of liquids collecting in the baffle 48 to the container 45, and pipe 50 establishes communication between the vapor spaces in the container 45 and the condenser 41.

The liquid which undergoes treatment in the vacuum pan 35 flows through the discharge outlet therein into the stand pipe 52, which may if desired, be provided with the valve 51. This tube passes through the top of a container 53 in which it terminates near the bottom of the receptacle within an eccentrically located well 54. At the point of entrance into the container 53 the standpipe 52 passes through a suitable stuffing box 55, whereby leakage of air from within the container 53 is prevented at this point. The height of the pipe 52 is such that a column of liquid may be maintained within said pipe above the level of the liquid within the container 53 of sufficient height to counterbalance the difference in pressure between that prevailing in the container 53 and that in the vacuum system, including the pan 35. In starting the operation of the apparatus a sufficient quantity of previously treated beverage is introduced into the pipe 52 to produce a column of liquid therein of the necessary height. In the operation of the system the dealcoholized beer or beverage which flows through the discharge outlet of the pan 35 into the pipe 52 adds its weight to that of the column of liquid already in the pipe, thereby overbalancing the pressure prevailing within the container 53 and causing a corresponding flow of liquid from the bottom of the pipe into the container. The container may be provided with a suitable valved opening 56, by means of which the pressure obtaining in the receptacle 53 may be controlled and the receptacle may be vented during flow of the liquid to atmospheric pressure.

It is readily apparent that the operation of this discharge may be continuous or intermittent. In the former case the valve 51 is kept permanently open, and the liquid which is continuously treated in the pan 35, flows continuously into the pipe 52. However, the valve 51 may be normally closed, and opened only when a predetermined amount of liquid has accumulated in the bottom of the pan 35, at which time the entire batch is admitted into the pipe, 52, causing an intermittent flow of the liquid into the receiver 53. It is furthermore apparent that any desired pressure may be maintained in the container 53, it being necessary that a pipe 52 be provided of sufficient length in order that a column of liquid high enough to counterbalance the pressure in the container may be maintained therein.

In order that the dealcoholized beer or beverage may be immediately subjected to its further treatment and to obviate any deterioration thereof which may arise from a continued exposure to the atmosphere, or by holding the same under undesirable conditions for an unnecessary length of time, the receptacle 53 may likewise be utilized for the continued treatment of the beverage. For this purpose the container may be provided with a coil 57, for the circulation of a cooling medium which is introduced through a suitable pipe, not shown and passes out through pipe 59. Carbon dioxide may be supplied to the liquid in the receptacle through a suitable pipe (not shown) and agitating means 61, mounted on a shaft 62 passing through the center of the bottom of the receptacle and driven by a motor 63, may be provided to aid in effecting carbonation of the beverage. A suitable gauge 64, thermometer 65, manometer 66 and trycock 67 may likewise be provided. A discharge pipe 68, which enters the receptacle 53 at a point outside of the well 54, and is provided with a valve 69 may be utilized for the discharge of the beverage from the container. By means of the cooling medium passed through the coils 57 the dealcoholized liquid flowing from the pan 35 may be immediately brought to any desired temperature, and may be, if desired, at once carbonated and discharged, or may be discharged prior to carbonation for further treatment in any desired manner.

Although I have described my invention as embodied in certain specific forms of apparatus and have presented specific details thereof, I do not intend the details of process or apparatus here set forth to be regarded as limitations upon the scope of the invention, except in so far as such limitations are included in the accompanying claims.

I claim:

1. In apparatus for dealcoholizing beverages, in combination with means for heating the beverages under reduced pressure, a receptacle, a stand pipe adapted to receive the discharge from the heating means and terminating near the bottom of the receptacle, and cooling coils within the receptacle.

2. In apparatus for dealcoholizing beverages, in combination with means for heating the beverages under reduced pressure, a receptacle, said receptacle being provided with upwardly extending walls forming a well therein, a stand pipe adapted to receive the discharge from the heating means and terminating within the well near the bottom of the receptacle, cooling coils within the receptacle, agitating means therein and means for supplying carbondioxide to the receptacle and for controlling the pressure therein.

3. In apparatus for receiving liquids discharged from vacuum heating devices, a receptacle, upwardly extending walls within the receptacle forming a well therein, a standpipe adapted to receive the discharge from the heating means and terminating within the well near the bottom of the receptacle, cooling coils within the receptacle, agitating means within the receptacle and means for supplying carbondioxide to the receptacle and for controlling the pressure therein.

4. In apparatus for receiving residue discharged from vacuum dealcoholizing devices, a receptacle, upwardly extending walls within the receptacle forming a well therein, a stand-pipe adapted to receive the discharge from the dealcoholizing device and terminating within the well near the bottom of the receptacle, agitating means within the receptacle and outside of the said well, and means for cooling the receptacle.

HERMAN HEUSER.